US010960934B2

(12) United States Patent
Shantz

(10) Patent No.: US 10,960,934 B2
(45) Date of Patent: Mar. 30, 2021

(54) PILLAR REINFORCEMENT

(71) Applicant: Zephyros, Inc., Romeo, MI (US)

(72) Inventor: Jeffrey T. Shantz, Romeo, MI (US)

(73) Assignee: Zephyros, Inc., Romeo, MI (US)

(*) Notice: Subject to any disclaimer, the term of this patent is extended or adjusted under 35 U.S.C. 154(b) by 65 days.

(21) Appl. No.: 16/480,089

(22) PCT Filed: Jan. 23, 2018

(86) PCT No.: PCT/US2018/014916
§ 371 (c)(1),
(2) Date: Jul. 23, 2019

(87) PCT Pub. No.: WO2018/136969
PCT Pub. Date: Jul. 26, 2018

(65) Prior Publication Data
US 2019/0382056 A1 Dec. 19, 2019

Related U.S. Application Data

(60) Provisional application No. 62/449,410, filed on Jan. 23, 2017.

(51) Int. Cl.
B60J 7/00 (2006.01)
B62D 29/00 (2006.01)
(Continued)

(52) U.S. Cl.
CPC .......... *B62D 29/002* (2013.01); *B62D 25/00* (2013.01); *B62D 27/02* (2013.01); *B62D 29/004* (2013.01); *B62D 29/04* (2013.01)

(58) Field of Classification Search
CPC ... B62D 29/002; B62D 25/00; C08L 2666/02; C08L 63/00; B29C 44/18; B29C 66/71; Y10T 428/233; B32B 7/02
See application file for complete search history.

(56) References Cited

U.S. PATENT DOCUMENTS 5,884,960 A 3/1999 Wycech
6,348,513 B1 2/2002 Hilborn et al.
(Continued)

FOREIGN PATENT DOCUMENTS

EP 2463180 A1 6/2012
GB 2375328 A 11/2002
(Continued)

OTHER PUBLICATIONS

Search Report & Written Opinion dated Jun. 15, 2018, Application No. PCT/US2018/014916.

*Primary Examiner* — Kiran B Patel
(74) *Attorney, Agent, or Firm* — The Dobrusin Law Firm, P.C.

(57) ABSTRACT

A structural reinforcement comprising a rigid polymeric structure having a longitudinal axis and including a lower portion and an upper portion each of the lower and upper portions including a top surface and bottom surface, an expandable adhesive material located onto a portion of each of the top and bottom surface of each of the upper and lower portions, wherein the rigid polymeric stricture includes a plurality of ribs and the top edge of one or more of the ribs is co-planar with the expandable adhesive material prior to activation of the expandable adhesive material.

20 Claims, 4 Drawing Sheets

(51) Int. Cl.
*B62D 25/00* (2006.01)
*B62D 27/02* (2006.01)
*B62D 29/04* (2006.01)

(56) References Cited

U.S. PATENT DOCUMENTS

| | | | |
|---|---|---|---|
| 6,368,438 B1 | 4/2002 | Chang et al. | |
| 6,467,834 B1 | 10/2002 | Barz et al. | |
| 6,811,864 B2 | 11/2004 | Czaplicki et al. | |
| 6,890,021 B2 | 5/2005 | Bock et al. | |
| 6,920,693 B2 | 7/2005 | Hankins et al. | |
| 6,921,130 B2 | 7/2005 | Barz et al. | |
| 6,932,421 B2 | 8/2005 | Barz | |
| 7,097,794 B2 * | 8/2006 | McLeod | B29C 44/18 264/275 |
| 7,125,461 B2 * | 10/2006 | Czaplicki | B62D 29/002 156/79 |
| 7,249,415 B2 | 7/2007 | Larsen et al. | |
| 7,318,873 B2 * | 1/2008 | Czaplicki | B29C 70/70 156/293 |
| 7,479,246 B2 * | 1/2009 | Muteau | B29C 44/385 264/218 |
| 7,735,906 B2 * | 6/2010 | Takahashi | B62D 25/04 296/193.06 |
| 8,087,916 B2 * | 1/2012 | Kanie | B29C 44/12 425/4 R |
| 8,430,448 B2 * | 4/2013 | Richardson | B29C 65/4855 296/187.02 |
| 10,173,727 B2 * | 1/2019 | Li | B62D 21/157 |
| 2004/0076831 A1 | 4/2004 | Hable et al. | |
| 2008/0257491 A1 * | 10/2008 | Czaplicki | B62D 29/04 156/293 |
| 2008/0296164 A1 * | 12/2008 | Dajek | B62D 29/004 205/80 |
| 2009/0085379 A1 | 4/2009 | Takahashi | |
| 2011/0104413 A1 * | 5/2011 | Mendibourne | B62D 29/002 428/35.7 |
| 2012/0043019 A1 * | 2/2012 | Belpaire | B29C 44/1228 156/293 |
| 2013/0241226 A1 * | 9/2013 | Shantz | B29C 44/188 296/1.07 |
| 2017/0050365 A1 * | 2/2017 | Richardson | B29C 66/5227 |
| 2017/0072887 A1 * | 3/2017 | Richardson | B62D 29/048 |
| 2018/0036970 A1 * | 2/2018 | Chmielewski | B29C 70/521 |
| 2019/0144050 A1 * | 5/2019 | Belpaire | B62D 25/04 296/187.01 |
| 2020/0130749 A1 * | 4/2020 | Qian | B62D 29/002 |
| 2020/0147899 A1 * | 5/2020 | Royston | B62D 29/002 |
| 2020/0247473 A1 * | 8/2020 | Shehu | B62D 25/04 |

FOREIGN PATENT DOCUMENTS

| | | |
|---|---|---|
| WO | 01/58741 A1 | 8/2001 |
| WO | 2010/097120 A1 | 9/2010 |

\* cited by examiner

PILLAR REINFORCEMENT

FIELD OF THE INVENTION

The present teachings relate generally to reinforcement of structures, and more particularly to reinforcement of vehicle structures using structural reinforcements with associated activatable (e.g., expandable) materials.

BACKGROUND OF THE INVENTION

In various locations throughout transportation vehicles, recent years have seen the increased use of structural reinforcements in which vehicle cavities are commonly fitted with structural reinforcements that aid in controlling deformation from an impact. For some applications, it has become popular in recent years to employ a carrier structure in combination with a secondary material, such as an expandable adhesive material as part of the reinforcement. See e.g., U.S. Pat. Nos. 6,932,421; 6,921,130; 6,920,693; 6,890,021; and 6,467,834 all incorporated by reference.

In addition, there are specific locations on a vehicle where structural reinforcement is particularly crucial. For example, vehicle pillars (A pillar, B, pillar C, pillar) often experience significant stress during crash, especially at locations where the pillars are joined with the vehicle roof. It would thus be beneficial to provide additional support at such locations.

SUMMARY OF THE INVENTION

The present teachings meet one or more of the above needs by the improved devices described herein.

In one aspect, the present teachings pertain to a structural reinforcement comprising a rigid polymeric structure having a longitudinal axis and including a lower portion and an upper portion, each of the lower and upper portions including a top surface and bottom surface, and an expandable adhesive material located onto a portion of each of the top and bottom surface of each of the upper and lower portions. The rigid polymeric structure may include a plurality of ribs and the top edge of one or more of the ribs may be co-planar with the expandable adhesive material prior to activation of the expandable adhesive material.

The structural reinforcement may include one or more weld tabs located in the upper portion. The weld tabs may be overmolded by the rigid polymeric material. A plurality of center ribs may be arranged substantially perpendicular to the longitudinal axis. The plurality of center ribs may be arranged substantially parallel to one another and substantially equidistant from one another. The lower portion may include at least one undulating surface that receives a layer of expandable adhesive.

The upper portion may have a longitudinal axis that is substantially perpendicular to the longitudinal axis of the structural reinforcement. The upper portion may include a plurality of the ribs arranged substantially perpendicular to the longitudinal axis of the upper portion. The structural reinforcement may include strips of expandable material on each of the top surface and bottom surface of the upper portion and lower portion such that the strips are substantially parallel to one another. The strips 38 of expandable material 12 on the top surface 34 of the upper portion 28 and the lower portion 26 may be offset from the strips 38 of expandable material 12 on the bottom surface 36. At least a portion of the top edges of the ribs that are co-planar with the expandable adhesive material may be located in a portion of the structural reinforcement having an undulating surface.

DETAILED DESCRIPTION

Figure 1:
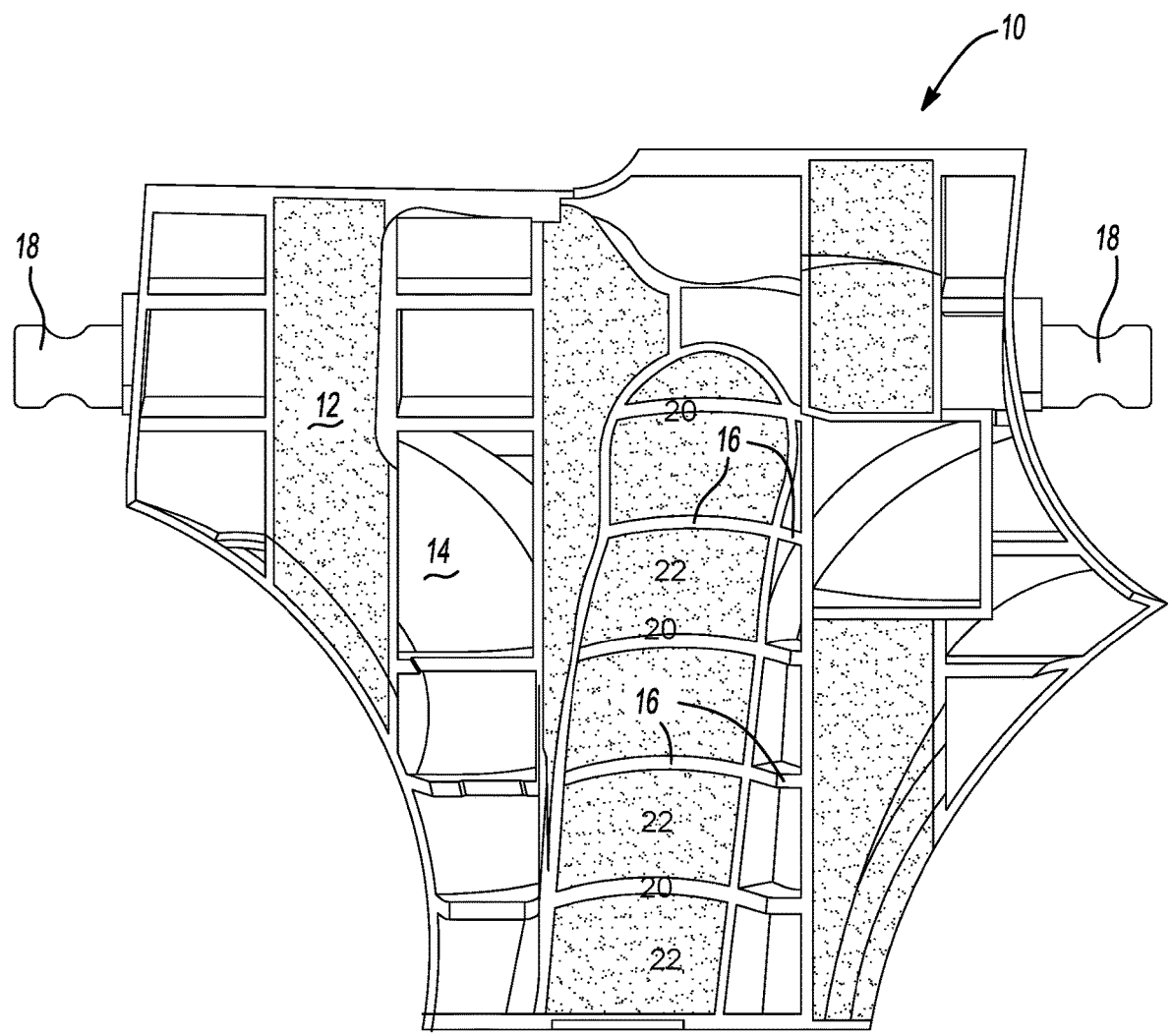
FIG. 1 is a front perspective view of an illustrative reinforcement in accordance with the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/449,410, filed on Jan. 23, 2017, the contents of this application being hereby incorporated by reference for all purposes.

The invention herein contemplates a unique approach for providing structural reinforcement in a vehicle structure, especially in areas where buckling of a cavity and/or of a reinforcement within a cavity is common. Such areas may include but may not be limited to, areas within or adjoining vehicle pillars and/or roof sections.

The rigid polymeric structure may be formed of a moldable material, which may be any polymeric material. The rigid polymeric structure which may include a polyamide material. The rigid polymeric structure may be formed by pultrusion. The polymeric material may be a reinforced polymeric material. For example, the polymeric material may be a glass fiber reinforced material. The polymeric material may include a polyurethane. The polymeric material may be a thermoset material. The polymeric material may be a thermoplastic material. The polymeric material may be a thermoplastic epoxy material. The polymeric material may be a fiber reinforced thermoplastic epoxy material or a fiber-reinforced polyurethane material.

The activatable material may be activated to expand, cure, or some combination thereof. The activatable material (e.g., expandable material) may be one or some combination of an adhesive, reinforcing and/or sealant material. The expandable material may be a material that experiences expansion and/or cure upon exposure to temperatures of between about 148.89° C. to about 204.44° C. (about 300° F. to about 400° F.) (i.e., temperatures typically experienced in automotive painting or coating operations). The expandable material may be foamed to a volume of at least 5% greater, at least 50% greater, at least 200% greater, at least 1000% greater, at least 2000% greater, at least 5000% greater or higher relative to the original unexpanded (e.g., green state) volume.

The expandable material may be an epoxy based material such as those disclosed in U.S. Pat. Nos. 5,884,960; 6,348,513; 6,368,438; 6,811,864; 7,125,461; 7,249,415; and U.S. Patent Publication No. 2004/0076831, hereby incorporated by reference herein for all purposes.

The structural reinforcement may also be formed with a plurality of rib structures. The ribs may be arranged in at least one section of the structural reinforcement such that there are a plurality of ribs arranged equidistant from one another, substantially parallel to one another, substantially perpendicular to the longitudinal axis of the structural reinforcement, or some combination thereof. The upper portion 28 may include a longitudinal axis 32 that runs substantially perpendicular to the longitudinal axis 24 of the structural reinforcement as a whole. The upper portion may include one or more ribs arranged substantially perpendicular to the longitudinal axis of the upper portion and thus substantially parallel to the longitudinal axis of the structural reinforcement as a whole.

It is also possible that the expandable material may be located onto only select surfaces of the device. For example, the expandable material may be located onto a top or bottom surface of a portion (e.g., the central portion 30 or side portion) of the device. It is possible that the expandable material be located onto surfaces of the portions that do not carry any rib structures.

It is possible that the expandable material 12 may be located in strips 38 on the top surface 34 and/or the bottom surface 36 that run parallel to the longitudinal axis 24 of the structural reinforcement 14. It is also possible that the strips of expandable material on the top surface are offset from, yet still substantially parallel to the strips of expandable material on the bottom surface of the structural reinforcement.

Figure 2:
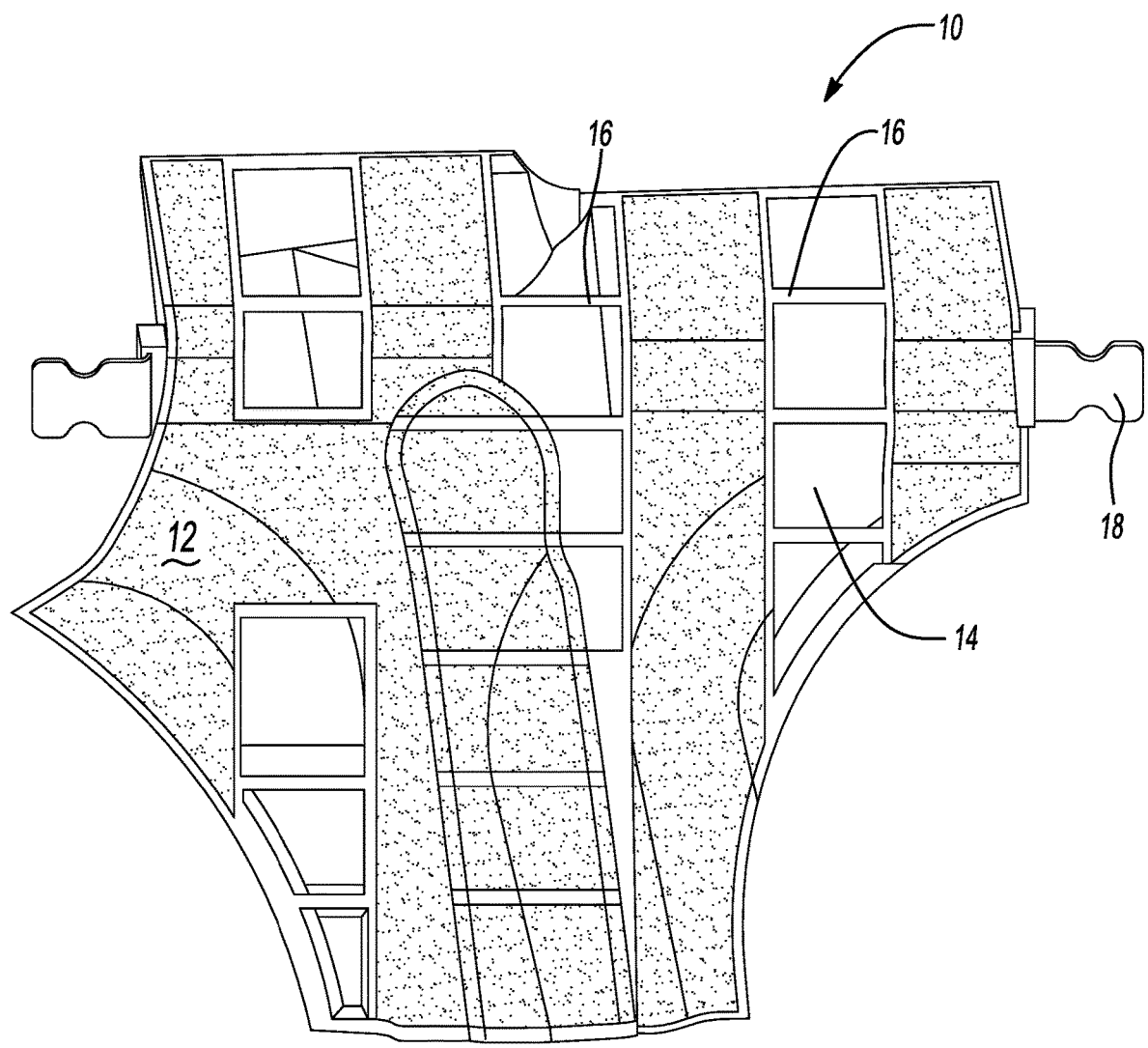
FIG. 2 is a rear perspective view of the reinforcement of FIG. 1.
Figure 3:
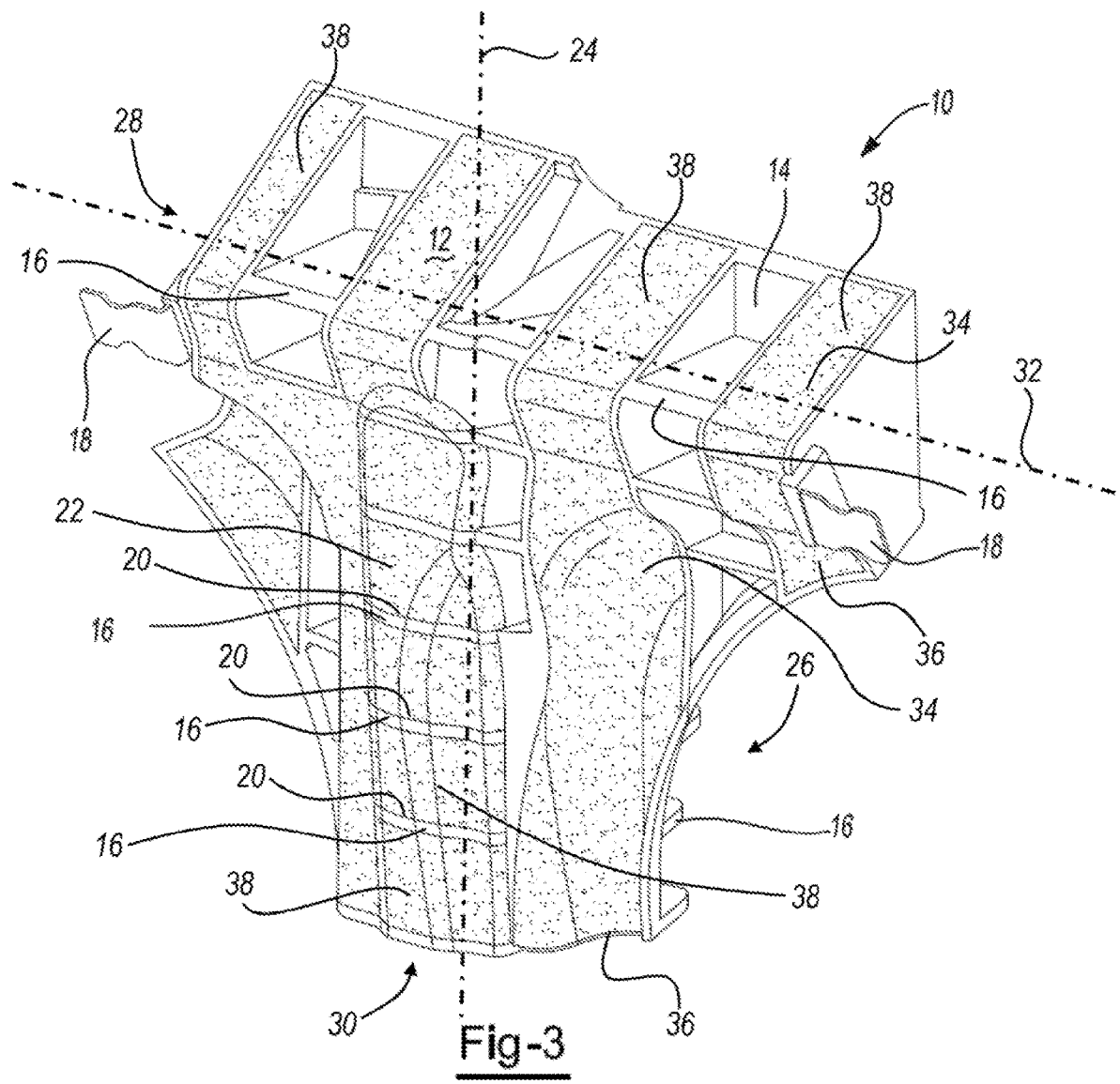
FIG. 3 is a top down perspective view of the reinforcement of FIG. 1.
Figure 4:
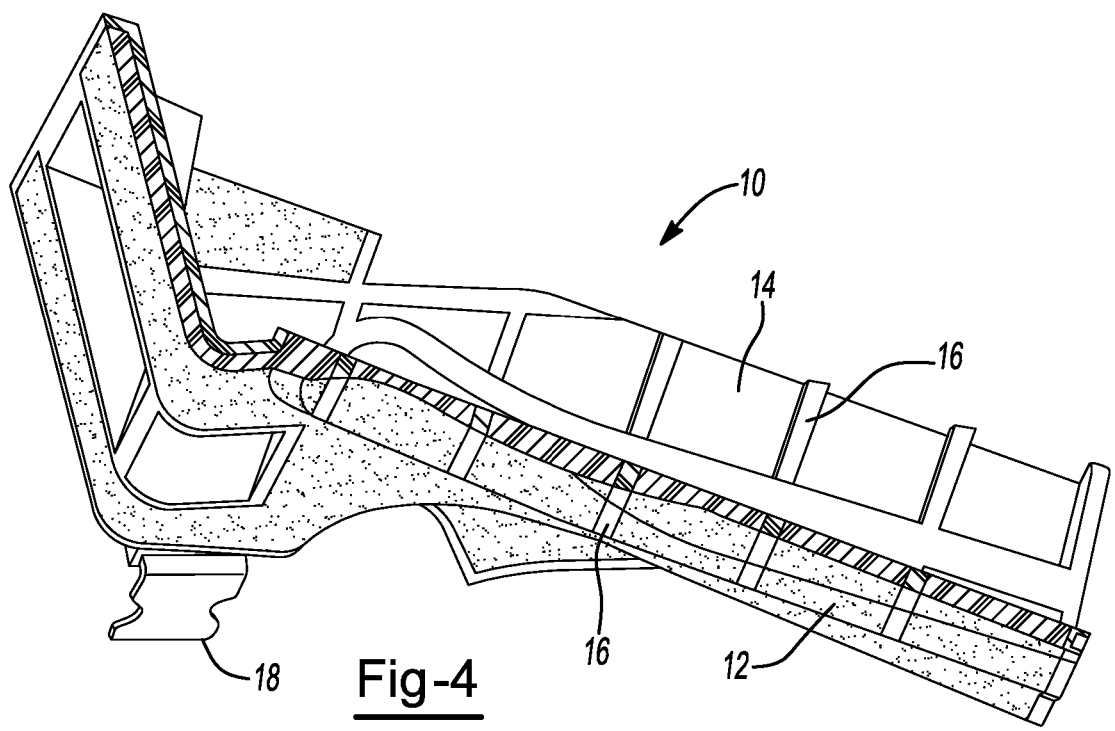
FIG. 4 is cross sectional view of the reinforcement of FIG. 1.
Figure 5:
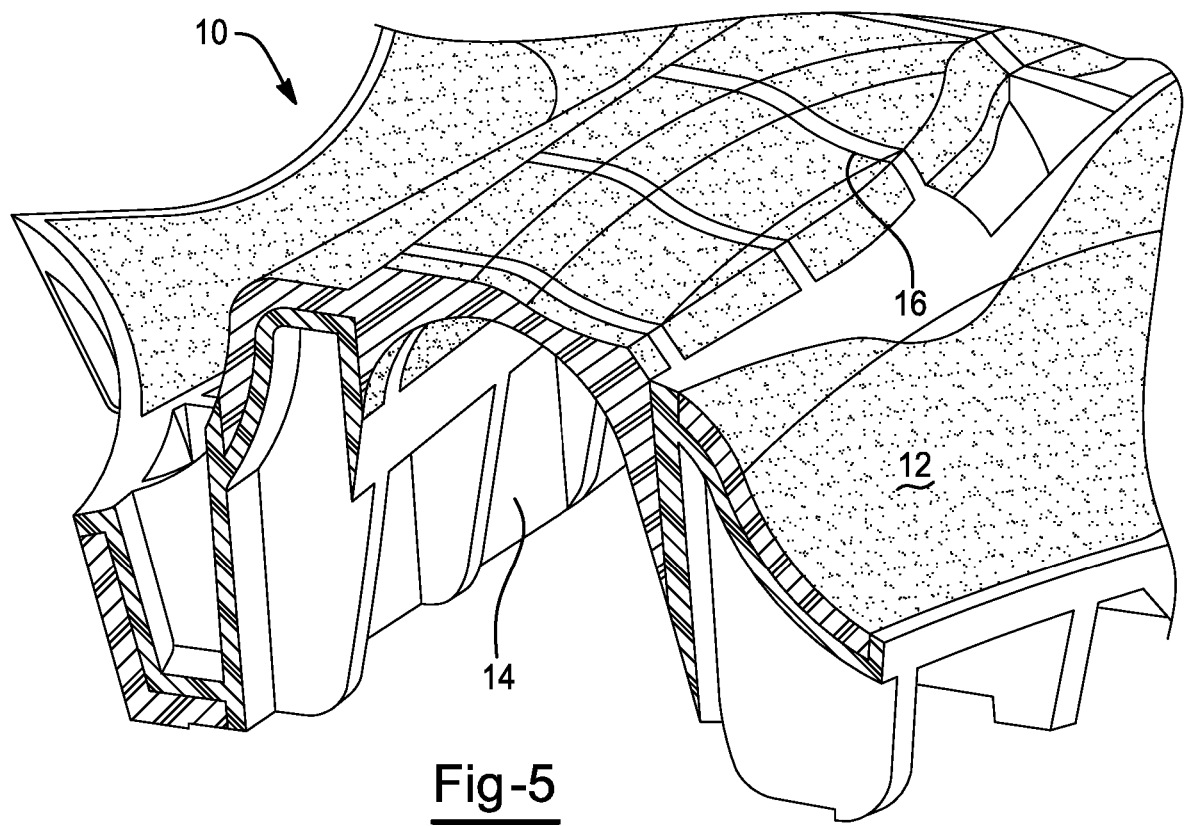
FIG. 5 is rear elevational view of the reinforcement of FIG. 1.

As shown for example in FIGS. 1-5, the reinforcement structure 10 is shown having a rigid polymeric structure 14. Portions of each of the polymeric 14 may include an expandable material 12 located thereon. The reinforcement may further include a plurality of rib structures 16. One or more weld tabs 18 may be connected to an upper portion of the reinforcement. As shown for example in FIGS. 1-5, some of the rib structures 16 may include an edge or top edge 20 that lies coplanar with a portion of expandable material 12. The edge 20 that lies co-planar with the expandable material 12 may be located on a portion of the structural reinforcement that includes an undulating surface 22.

The rigid polymeric structure may be formed by an injection molding step. The expandable material may be applied to the rigid polymeric structure by a second molding process (e.g., a two-shot molding process) whereby the adhesive material is injection molded onto the base reinforcing structure.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A structural reinforcement comprising:
   i) a rigid polymeric structure having a longitudinal axis and including a lower portion and an upper portion, each of the lower portion and the upper portion including a top surface and bottom surface;
   ii) an expandable adhesive material located onto a portion of each of the top surface and the bottom surface of each of the upper portion and the lower portion;
   iii) a central portion including at least three ribs that are substantially parallel with one another and substantially equidistant from one another, wherein the at least three ribs are arranged substantially perpendicular to the longitudinal axis of the rigid polymeric structure;
   wherein the at least three ribs include a top edge that is substantially co-planar with the expandable adhesive material prior to activation of the expandable adhesive material.

2. The structural reinforcement of claim 1, including one or more weld tabs located in the upper portion.

3. The structural reinforcement of claim 2, wherein the one or more weld tabs are overmolded by the rigid polymeric structure.

4. The structural reinforcement of claim 1, wherein the lower portion includes at least one undulating surface that receives a layer of the expandable adhesive material.

5. The structural reinforcement of claim 1, wherein the upper portion has a longitudinal axis that is substantially perpendicular to the longitudinal axis of the structural reinforcement.

6. The structural reinforcement of claim 5, wherein the upper portion includes a plurality of ribs arranged substantially perpendicular to the longitudinal axis of the upper portion.

7. The structural reinforcement of claim 1, including strips of the expandable adhesive material on each of the top surface and bottom surface of the upper portion and the lower portion such that the strips are substantially parallel to one another.

8. The structural reinforcement of claim 7, wherein the strips of the expandable adhesive material on the top surface of the upper portion and the top surface of the lower portion are offset from the strips of expandable material on the bottom surface.

9. The structural reinforcement of claim 1, wherein at least a portion of the top edges of the at least three ribs that are co-planar with the expandable adhesive material are located in a portion of the structural reinforcement having an undulating surface.

10. A structural reinforcement comprising:
   i) a rigid polymeric structure having a longitudinal axis and including a lower portion and an upper portion, each of the lower portion and the upper portion including a top surface and bottom surface, the upper portion including one or more weld tabs located therein;
   ii) an expandable adhesive material (12) located onto a portion of each of the top surface and the bottom surface of each of the upper portion and the lower portion, and including strips of the expandable adhesive material such that the strips are substantially parallel to one another;
   iii) a central portion including at least three ribs that are substantially parallel with one another and substantially equidistant from one another, the central portion including an undulating surface;
   wherein the at least three ribs include a top edge that is substantially co-planar with the expandable adhesive material prior to activation of the expandable adhesive material.

11. The structural reinforcement of claim 10, wherein the weld tabs are overmolded by the rigid polymeric structure.

12. The structural reinforcement of claim 10, wherein the at least three ribs are arranged substantially perpendicular to the longitudinal axis of the rigid polymeric structure.

13. The structural reinforcement of claim 10, wherein at least a portion of the undulating surface receives a layer of the expandable adhesive material.

14. The structural reinforcement of claim 10, wherein the upper portion has a longitudinal axis that is substantially perpendicular to the longitudinal axis of the structural reinforcement.

15. The structural reinforcement of claim 5, wherein the upper portion includes a plurality of ribs arranged substantially perpendicular to the longitudinal axis of the upper portion.

16. The structural reinforcement of claim 10, wherein the strips of the expandable adhesive material on the top surface of the upper portion and the lower portion are offset from the strips of the expandable adhesive material on the bottom surface.

17. The structural reinforcement of claim 1, including one or more weld tabs located in the rigid polymeric structure.

18. The structural reinforcement of claim 17, wherein the one or more weld tabs are overmolded by the rigid polymeric structure.

19. The structural reinforcement of claim 1, wherein the upper portion and lower portion each include one or more ribs that are free of any of the expandable adhesive material.

20. The structural reinforcement of claim 1, wherein the upper portion is wider than the lower portion.

\* \* \* \* \*